(12) United States Patent
Sadler et al.

(10) Patent No.: US 7,983,182 B2
(45) Date of Patent: Jul. 19, 2011

(54) METHODS AND APPARATUS FOR EXCHANGING NETWORK CONNECTIVITY AND CAPABILITY INFORMATION

(75) Inventors: Jonathan B. Sadler, Naperville, IL (US); T. Benjamin Mack-Crane, Downers Grove, IL (US)

(73) Assignee: Tellabs Operations, Inc., Naperville, IL (US)

( * ) Notice: Subject to any disclaimer, the term of this patent is extended or adjusted under 35 U.S.C. 154(b) by 780 days.

(21) Appl. No.: 11/787,698

(22) Filed: Apr. 17, 2007

(65) Prior Publication Data

US 2008/0183890 A1     Jul. 31, 2008

Related U.S. Application Data

(63) Continuation-in-part of application No. 11/374,335, filed on Mar. 13, 2006, and a continuation-in-part of application No. 10/355,306, filed on Jan. 31, 2003, now Pat. No. 7,301,911.

(60) Provisional application No. 60/353,254, filed on Feb. 1, 2002, provisional application No. 60/661,203, filed on Mar. 11, 2005.

(51) Int. Cl.
*G01R 31/08* (2006.01)
*H04L 12/28* (2006.01)

(52) U.S. Cl. ......................... 370/252; 370/254

(58) Field of Classification Search .................. None
See application file for complete search history.

(56) References Cited

U.S. PATENT DOCUMENTS

| | | | |
|---|---|---|---|
| 5,995,503 A | 11/1999 | Crawley et al. | |
| 6,223,219 B1 * | 4/2001 | Uniacke et al. | 709/223 |
| 6,363,319 B1 | 3/2002 | Hsu | |
| 6,584,071 B1 | 6/2003 | Kodialam et al. | |
| 6,594,268 B1 | 7/2003 | Aukia et al. | |
| 6,614,785 B1 * | 9/2003 | Huai et al. | 370/352 |
| 6,985,959 B1 | 1/2006 | Lee | |
| 6,990,517 B1 * | 1/2006 | Bevan et al. | 709/223 |
| 7,161,910 B2 | 1/2007 | Maeno | |
| 7,301,911 B2 | 11/2007 | Mack-Crane et al. | |

(Continued)

FOREIGN PATENT DOCUMENTS

EP    1 146 682 A2    10/2001

(Continued)

OTHER PUBLICATIONS

Communication Pursuant to Article 96(2) EPC, Application No. 03 737 577.1-1249; reference No. JL4475; dated May 22, 2007; 6 pages.

(Continued)

*Primary Examiner* — Nittaya Juntima
(74) *Attorney, Agent, or Firm* — Hamilton, Brook, Smith & Reynolds, P.C.

(57) ABSTRACT

A method for managing transport node capability information includes discovering a link end of a local transport node, modelling the local transport node's capability information as a first set of information structures, discovering a neighbor transport node, establishing a control adjacency link between control elements of the local transport node and neighbor transport node, modelling the neighbor transport node's capability information as a second set of information structures, exchanging the first and second sets of information structures between the control elements and identifying potential network layer links between the local and neighbor transport nodes, based on correlations in the first and second sets of information structures.

20 Claims, 8 Drawing Sheets

U.S. PATENT DOCUMENTS

| | | | |
|---|---|---|---|
| 7,313,328 | B2 | 12/2007 | Oki et al. |
| 7,545,829 | B2 | 6/2009 | Shimazaki et al. |
| 7,617,302 | B1 * | 11/2009 | Uniacke et al. ............ 709/223 |
| 7,821,946 | B2 | 10/2010 | Mack-Crane et al. |
| 7,889,675 | B2 | 2/2011 | Mack-Crane et al. |
| 2001/0033548 | A1 | 10/2001 | Saleh et al. |
| 2002/0085498 | A1 | 7/2002 | Nakamichi et al. |
| 2004/0081105 | A1 | 4/2004 | Shimazaki et al. |
| 2010/0232416 | A1 | 9/2010 | Mack-Crane et al. |
| 2011/0044348 | A1 | 2/2011 | Kini et al. |

FOREIGN PATENT DOCUMENTS

| | | |
|---|---|---|
| EP | 1 152 631 A2 | 11/2001 |
| WO | WO 03/067835 | 8/2003 |
| WO | WO 2006/104795 | 10/2006 |
| WO | WO 2007/106102 | 9/2007 |
| WO | WO 2008/131076 A1 | 10/2008 |

OTHER PUBLICATIONS

Notification of Transmittal of the International Search Report and the Written Opinion of the International Searching Authority, or the Declaration, PCT/US2008/060590; dated Jul. 25, 2008.

Architecture for the Automatic Switched Optical Networks (ASON), ITU-T Draft Study Period 2005-2008, International Telecommunication Union, Geneva, CH, No. G.8080/Y .1304 (Jun. 6, 2006, XP017404643.

"ASON Routing Architecture and Requirements for Link State Protocols", G.7715.1/Y.1706.1 ITU-T Standard in Force (I), International Telecommunication Union, Geneva, CH, No. G.7715.1/Y. 1760.1 Feb. 22, 2004, XP017400939.

"Generalized Automatic Discovery Techniques; G.7714/Y.1705", ITU-T Standard in Force (I), International Telecommunication Union, Geneva, CH, No. G.7714/Y.1705, Aug. 22, 2005, XP017404598.

Wayne D. Grover, et al., "Cycle-Oriented Distributed Preconfiguration: Ring-like Speed with Mesh-like Capacity for Self-Planning Network Restoration", Proceedings of IEEE ICC'98, Atlanta, Georgia, Jun. 7-11, 1998, pp. 537-543.

J.W. Suurballe, et al., "A Quick Method for Finding Shortest Pairs of Disjoint Paths", Networks, vol. 14 (1984), pp. 325-336.

Ramesh Bhandari, et al. "High Level Requirements for Optical Shared Mesh Restoration", Internet Engineering Task Force, Nov. 2000, 5 unnumbered pages.

Wayne D. Grover, et al., "Cycle-Oriented Distributed Preconfiguration: Ring-like Speed with Mesh-like Capacity for Self-Organizing Proactive Network Restoration," Presentation Slides, 9 unnumbered pages, ICC '98, Jun. 7-11, 1998 Atlanta, Georgia.

Notification Concerning Transmittal of International Preliminary Report on Patentability (Chapter 1 of the Patent Cooperation Treaty); dated Oct. 29, 2009 for International Application No. PCT/US2008/060590.

International Search Report for Int'l Application No. PCT/US03/02927; Date of Mailing: Jun. 12, 2003.

Notification of Transmittal of the International Search Report and the Written Opinion of the International Searching Authority for Int'l Application No. PCT/US2006/015894; Date of Mailing: Jan. 12, 2007.

International Preliminary Report on Patentability for Int'l Application No. PCT/US2006/015894; Date of Issuance: Sep. 16, 2008.

Communication Pursuant to Article 94(3) EPC for European Application No. 03 737 577.1; Dated: Sep. 25, 2009.

Wayne D. Grover, et al., "Cycle-Oriented Distributed Preconfiguration: Ring-like Speed with Mesh-like Capacity for Self-Planning Network Restoration", Proceedings of IEEE ICC'98, Atlanta, Georgia, Jun. 7-11, 1998, pp. 537-543.

J.W. Suurballe, et al., "A Quick Method for Finding Shortest Pairs of Disjoint Paths", Networks, vol. 14 (1984), pp. 325-336.

Ramesh Bhandari, et al. "High Level Requirements for Optical Shared Mesh Restoration", Internet Engineering Task Force, Nov. 2000, 5 unnumbered pages.

Wayne D. Grover, et al., "Cycle-Oriented Distributed Preconfiguration: Ring-like Speed with Mesh-like Capacity for Self-Organizing Proactive Network Restoration," Presentation Slides, 9 unnumbered pages, ICC '98, Jun. 7-11, 1998 Atlanta, Georgia.

Mack-Crane, et al., "Enhancements to GMPLS Signaling for Optical Technologies", AlterNIC—Network Information Center, pp. 1-15, http://www.alternic.org/drafts/drafts-m-n/draft-mack-crane-gmpls-signaling-enhancements, Nov. 2000.

Kompella, et al., "OSPF Extensions in Support of Generalized MPLS", AlterNIC—Network Information Center, pp. 1-13, http://www.alternic.org/drafts/drafts-k-l/draft-kompella -ospf-gmpls-extensions-00.html.

Papadimitriou, et al.,"Generalized MPLS Architecture for Multi-Region Networks", pp. 1-28, http://www.ietf.org/internet-drafts/draft-vigoureux-shiomoto-ccamp-gmpls-mrn-00.txt, Oct. 2002.

Mannie, et al., "Extensions to OSPF and IS-IS in support of MPLS for SDH/SONET Control", AlterNIC—Network Information Center, pp. 1-25, file://C:/Documents%20 and %20Settings/CFISH/Local%20Settings/Temp/Temporar, Jul. 2000.

Mannie, et al., "GMPLS Extensions to OSPF and IS-IS for SONET/SDH Network Control", CCamp Working Group, pp. 1-15, Jun. 2002.

Bernstein, "Interdomain optical routing", Journal of Optical Networking, vol. 1, No. 2, pp. 80-92, Feb. 2002.

Bernstein, "Framework for MPLS-Based Control of Optical SDH/SONET Networks" IEEE Network Jul./Aug. 2001, pp. 20-26, 2001.

Information technology—Telecommunications and information exchange between systems—Intermediate system to Intermediate system intra-domain routeing information exchange protocol for use in conjunction with the protocol for providing the connectionless-mode Network Service (ISO 8473), Reference No. ISO/IEC 10589:1992(E), International Standard, cover page + pp. 122-125, Jun. 15, 1992.

"Private Network-Network Interface Specification Version 1.0" (PNNI1.0), af-pnni-0055.000, The ATM Forum Technical Committee, Mar. 1996.

Coltun "The OSPF Opaque LSA Option", Network Working Group, 13 unnumbered pages, http://www.ietf.org/rfc/rfc2370.txt?number=237, Jul. 1998.

Katz "Traffic Engineering Extensions to OSPF", Network Working Group, 9 unnumbered pages, http://www.watersprings.org/links/mlr/id/draft-katz-ospf-traffice 06.1, Oct. 2001.

Li, et al., "IS-IS extensions for Traffic Engineering", Network Working Group, 11 unnumbered pages, http://search.ietf.org/internet-drafts/draft-ietf-isis-traffic 0.4, Aug. 2001.

Kompella, et al., "Routing Extensions in Support of Generalized MPLS", Network Working Group, 20 unnumbered pages, http://search.ietf.org/internet-drafts/draft-ietf-ccamp-gmpls-routing01, Nov. 2001.

Kompella, et al., "OSPF Extensions in Support of Generalized MPLS", CCAMP Working Group, 9 unnumbered pages, http://www.ietf.org/internet-drafts/draft-ietf-ccamp-ospf-gmpls-extensions03, Jan. 2002.

Kompella, et al., "IS-IS Extensions in Support of Generalized MPLS", Network Working Group, 9 unnumbered pages, http://www.ietf.org/internet-drafts/draft-ietf-isis-gmpls-extensions07, Jun. 2002.

Kompella, et al., "LSP Hierarchy with MPLS TE", Network Working Group, 10 unnumbered pages, http://search.ietf.org/internet-drafts/draft-ietf-mpls-lsp-hierarchy-03, May 2001.

Kompella, et al., "Link Bundling in MPLS Traffic Engineering", 9 unnumbered pages, http://search.ietf.org/internet-drafts/draft-ietf-mpls-bundle-01, May 2001.

* cited by examiner

| SIGNAL TYPE: ETH<br>CAG ID: 4 | | SIGNAL TYPE: ETH<br>CAG ID: 4 | |
|---|---|---|---|
| | CON TYPE: C-B<br>REGEN FLAG: 0<br>NEXT CAG ID: 2<br>ADAPT TYPE: 1 | | CON TYPE: C-B<br>REGEN FLAG: 0<br>NEXT CAG ID: 2<br>ADAPT TYPE: 1 |
| | CON TYPE: C-B<br>REGEN FLAG: 0<br>NEXT CAG ID: 3<br>ADAPT TYPE: 1 | | CON TYPE: C-B<br>REGEN FLAG: 0<br>NEXT CAG ID: 3<br>ADAPT TYPE: 1 |
| | CON TYPE: B-C<br>REGEN FLAG: 0<br>NEXT CAG ID: | | CON TYPE: B-C<br>REGEN FLAG: 0<br>NEXT CAG ID: |
| | CON TYPE: B-C<br>REGEN FLAG: 0<br>NEXT CAG ID: | | CON TYPE: B-C<br>REGEN FLAG: 0<br>NEXT CAG ID: |

| SIGNAL TYPE: STS1<br>CAG ID: 2 | | SIGNAL TYPE: STS3c<br>CAG ID: 3 | | SIGNAL TYPE: STS3c<br>CAG ID: 2 | | SIGNAL TYPE: STS12c<br>CAG ID: 3 | |
|---|---|---|---|---|---|---|---|
| | CON TYPE: C-B<br>REGEN FLAG: 0<br>NEXT CAG ID: 1<br>ADAPT TYPE: 1 | | CON TYPE: C-B<br>REGEN FLAG: 0<br>NEXT CAG ID: 1<br>ADAPT TYPE: 1 | | CON TYPE: C-B<br>REGEN FLAG: 0<br>NEXT CAG ID: 1<br>ADAPT TYPE: 1 | | CON TYPE: C-B<br>REGEN FLAG: 0<br>NEXT CAG ID: 1<br>ADAPT TYPE: 1 |
| | CON TYPE: B-C<br>REGEN FLAG: 0<br>NEXT CAG ID: | | CON TYPE: B-C<br>REGEN FLAG: 0<br>NEXT CAG ID: | | CON TYPE: B-C<br>REGEN FLAG: 0<br>NEXT CAG ID: | | CON TYPE: B-C<br>REGEN FLAG: 0<br>NEXT CAG ID: |
| | CON TYPE: C-A<br>REGEN FLAG: 0<br>NEXT CAG ID: 4 | | CON TYPE: C-A<br>REGEN FLAG: 0<br>NEXT CAG ID: 4 | | CON TYPE: C-A<br>REGEN FLAG: 0<br>NEXT CAG ID: 4 | | CON TYPE: C-A<br>REGEN FLAG: 0<br>NEXT CAG ID: 4 |
| | CON TYPE: A-C<br>REGEN FLAG: 0<br>NEXT CAG ID: | | CON TYPE: A-C<br>REGEN FLAG: 0<br>NEXT CAG ID: | | CON TYPE: A-C<br>REGEN FLAG: 0<br>NEXT CAG ID: | | CON TYPE: A-C<br>REGEN FLAG: 0<br>NEXT CAG ID: |

| SIGNAL TYPE: OC48<br>CAG ID: 1 | | SIGNAL TYPE: OC48<br>CAG ID: 1 | |
|---|---|---|---|
| | CON TYPE: A-D<br>REGEN FLAG: 0<br>NEXT CAG ID: | | CON TYPE: A-D<br>REGEN FLAG: 0<br>NEXT CAG ID: |
| | CON TYPE: D-A<br>REGEN FLAG: 0<br>NEXT CAG ID: 2 | | CON TYPE: D-A<br>REGEN FLAG: 0<br>NEXT CAG ID: 2 |
| | CON TYPE: D-A<br>REGEN FLAG: 0<br>NEXT CAG ID: 3 | | CON TYPE: D-A<br>REGEN FLAG: 0<br>NEXT CAG ID: 3 |

*FIG. 8*

METHODS AND APPARATUS FOR EXCHANGING NETWORK CONNECTIVITY AND CAPABILITY INFORMATION

CROSS-REFERENCE TO RELATED APPLICATION

This application is a continuation-in-part of U.S. application Ser. No. 11/374,335, filed Mar. 13, 2006, and entitled "METHOD AND SYSTEM FOR MULTI-LAYER NETWORK ROUTING," which claimed the benefit of U.S. Provisional Application No. 60/661,203 filed Mar. 11, 2005, and is a continuation-in-part of U.S. application Ser. No. 10/355,306, now U.S. Pat. No. 7,301,911, filed Jan. 31, 2003, which claimed the benefit of U.S. Provisional Application No. 60/353,254, filed Feb. 1, 2002, all of which are incorporated herein by reference.

FIELD OF THE INVENTION

This invention pertains to communications networks. More particularly, the invention pertains to methods and apparatus for exchanging a transport node's network connectivity and capability information.

BACKGROUND OF THE INVENTION

The Telecommunication Standardization Sector of the International Telecommunication Union (ITU-T) has provided a Recommendation G.7714 which describes Transport Entity Capability Exchange (TCE) as a process that follows Layer Adjacency Discovery. A carrier protocol state machine is defined for TCE, and some information included in TCE is listed, but the information content of particular TCE exchanges is not addressed in detail. There are plans for ITU-T Recommendation G.7716 (or related recommendations) to specify initialization of ASON systems. Accordingly, it is useful to develop methods and apparatus to manage the information required to initialize links and protocol relationships which may be included in these recommendations.

DETAILED DESCRIPTION OF THE INVENTION

Example embodiments of the invention include methods and apparatus for an information model for the exchange of layer network connectivity and adaptation capabilities at the ends of a discovered adjacency. This model allows Transport Entity Capability Exchange (TCE) or other exchange of transport node capability information to be accomplished without requiring that the details of the layer network technologies supported be understood at both ends of the adjacency.

Generation and Correlation of Transport Node Capability Information

A transport node may provide flexibility in more than one layer of network. Accordingly, transport nodes at each end of a layer network adjacency may provide various network connectivity and capabilities (such as for example to cross-connect, terminate, or adapt a signal carried over a link that forms a layer network adjacency). Details of such transport node capabilities can be described as a transport node's capability information and such information may be transmitted over discovered link connection. It is useful for a control element associated with a transport node to understand the flexibility supported by a transport node in order to operate properly. In an example embodiment of the invention, to develop this awareness, a control element associated with the transport node has a discovery agent that becomes aware of the local (or also referred to as near) transport node's capabilities; exchanges capability information with the control element of a neighbour (or also referred to as far) transport node; correlates the common capabilities to determine the network layers that potential links exist in; and provides this information to a link resource manager associated with the local transport node.

Figure 1:
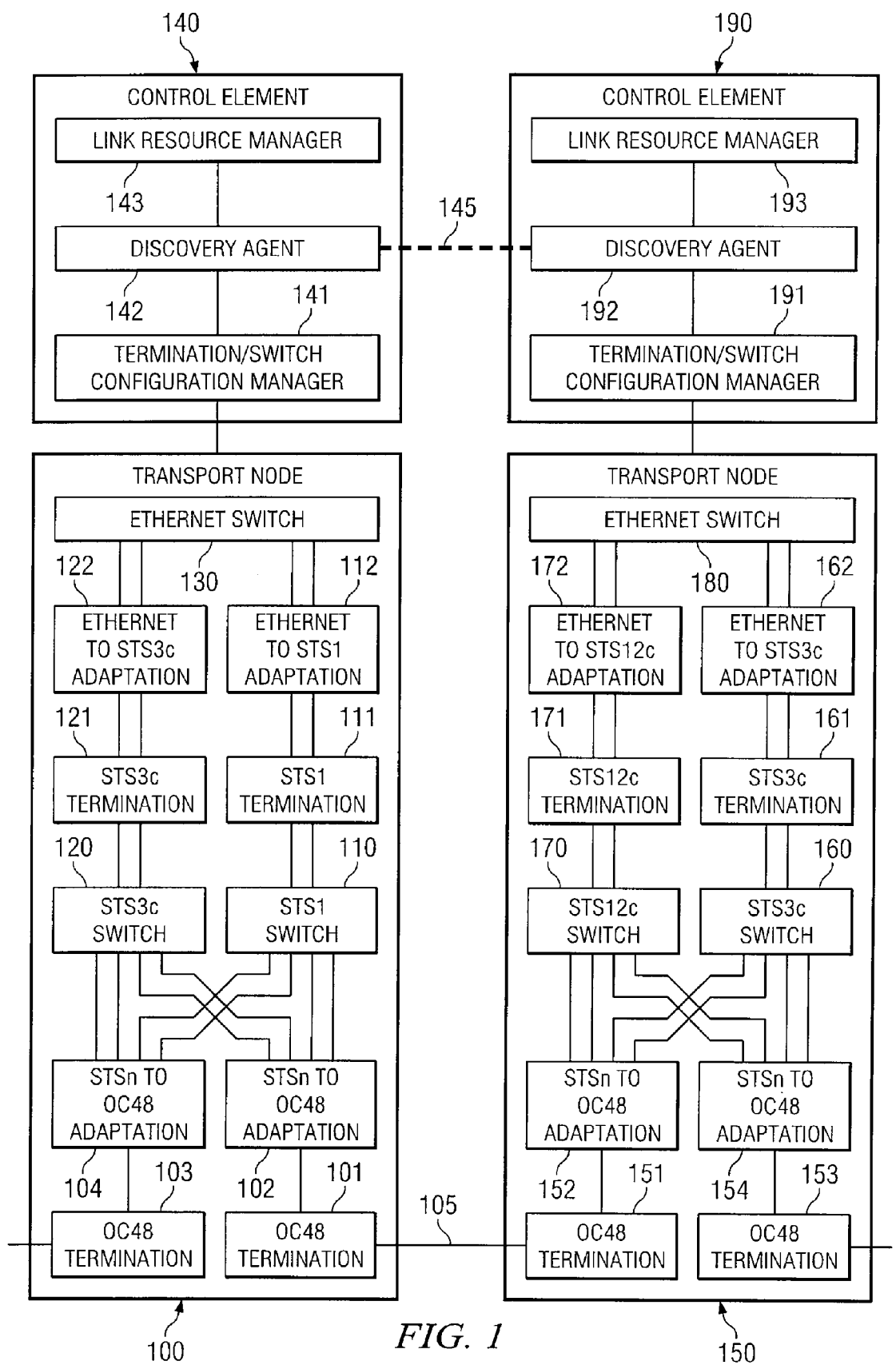
FIG. 1 illustrates a system for exchanging a transport node's capability information, according to an example embodiment of the invention.

FIG. 1 illustrates a system for exchanging a transport node's network connectivity and capability information, according to an example embodiment of the invention. FIG. 1 shows two Transport Nodes, 100 and 150, connected to each other by equipment adjacency link 105. Connected to Transport Node 100 is corresponding Control Element 140 and connected to Transport Node 190 is corresponding Control Element 190. Control Elements 140 and 190 are connected to each other by control adjacency link 145.

In an example embodiment of the invention, Transport Nodes 100 and 150 flexibly support various different switching layers over the same interface through various switching and adaptation functions in each Transport Node. For instance, Transport Node 100 includes the example embodiment switching and adaptation functions: an Ethernet switching function 130, an Ethernet to STS3c Adaptation function 122, an Ethernet to STS1 Adaptation function 112, an STS3c Termination function 121, an STS1 Termination function 111, an STS3c switching function 120, an STS1 switching function 110, an STSn to OC48 Adaptation function 104, an STSn to OC48 Adaptation function 102, and two OC48 Termination functions 103 and 101. Transport Node 150 includes the example embodiment switching and adaptation functions: an Ethernet switching function 180, an Ethernet to STS12c Adaptation function 172, an Ethernet to STS3c Adaptation function 162, an STS12c Termination function 171, an STS3c Termination function 161, an STS12c switching function 170, an STS3c switching function 160, an STSn to OC48 Adaptation function 152, an STSn to OC48 Adaptation function 154, and two OC48 Termination functions 151 and 153. In each of the above listed adaptation functions, a signal can be adapted from one format (e.g. Ethernet) to another format (e.g. STS3c), using methods known to those skilled in the art. Furthermore, it can be understood to those skilled in the art that that other types of switching and adaptation functions may be included in example embodiment transport nodes.

In an example embodiment of the invention, a Control Element includes a Link Resource Manager (143 or 193 in FIG. 1), connected to a Discovery Agent (143 or 193 in FIG. 1), which is connected to a Termination/Switch Configuration Manager (143 or 193 in FIG. 1). Control Elements 140 and 190 utilize the Discovery Agents 142 and 192 which identify the flexibility that is provided at a link end (a port or other equipment interface at the end of an equipment adjacency link) (such as equipment interfaces 101 and 151) as well as further switching capabilities made accessible by adaptation functions (such as adaptation functions 112, 122, 102, 104, 172, 162, 152, and 154). Discovery Agents 142 and 192 access this information from the Termination/Switching Configuration Managers, 141 and 191 respectively. Discovery Agents 142 and 192 further communicate with each other over control adjacency link 145 to determine the useable capabilities of Transport Nodes 100 and 150 (e.g. STS3c and Ethernet) and identify the network layers in which potential links may exist. Discovery Agents 142 and 192 may communicate those potential links to their respective Link Resource Managers 143 and 193.

Figure 2:
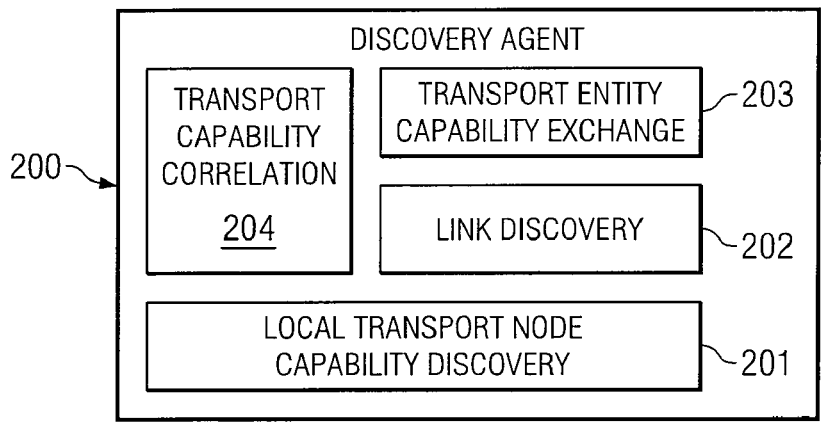
FIG. 2 illustrates discovery agent system, according to an example embodiment of the invention.

In an example embodiment of the invention, a Discovery Agent is may be made up of a number of subagents, each taking on roles identified by Telecommunication Standardization Sector of the International Telecommunication Union (ITU-T) Recommendation G.7714 (hereinafter referred to as "G.7714"). In the example embodiment shown in FIG. 2, Discovery Agent 200 is made up of a Transport Capability Correlation function 204, a Transport Entity Capability Exchange function 203, a Link Discovery function 202 and a Local Transport Node Capability Discovery function 201. As a Local Transport Node Capability Discovery function discovers a link end and other resources (e.g. common or shared service functions) on a transport node, the method shown in FIG. 3 may be invoked, once for each link end.

Figure 3:
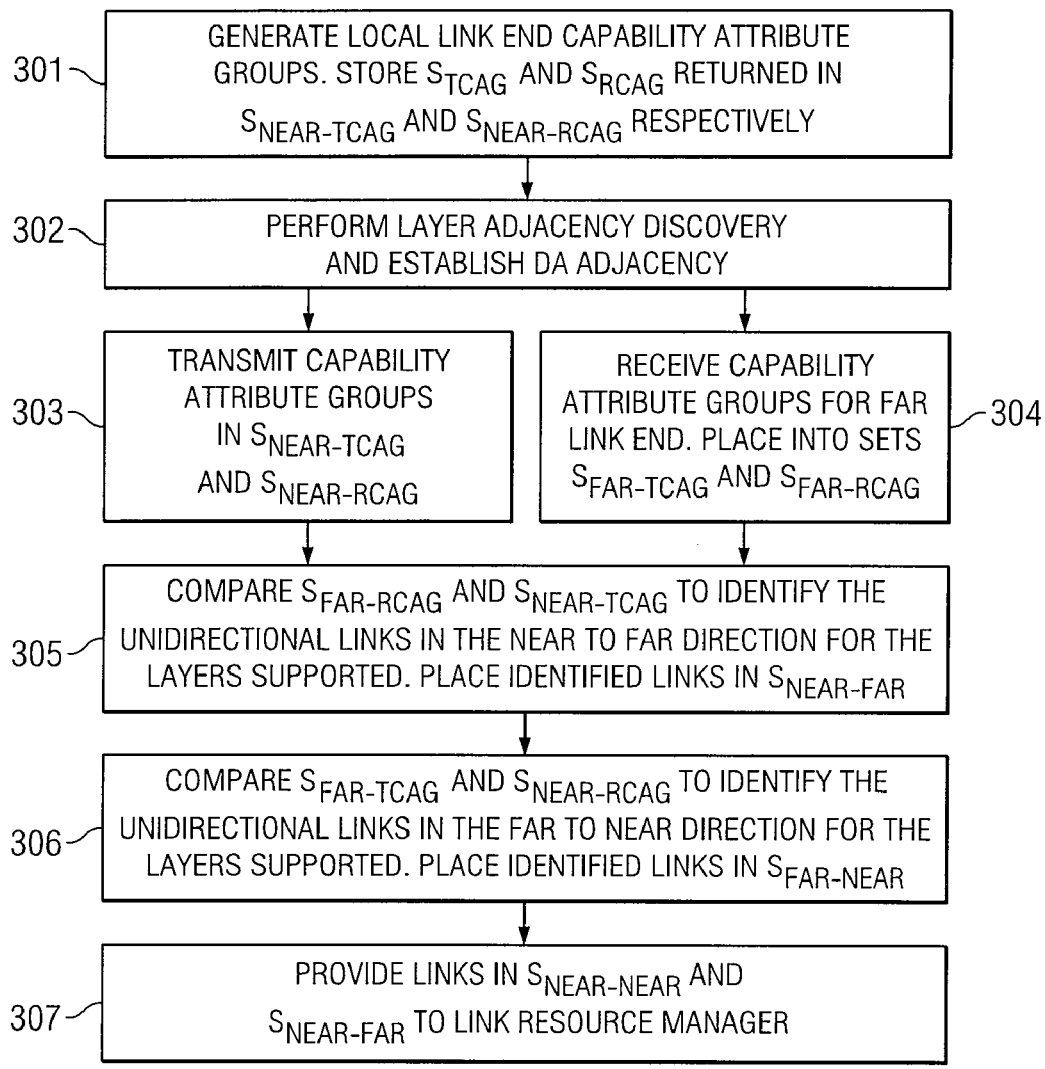
FIG. 3 is a flow diagram of a method which may be performed by a discovery agent, upon the discovery of a link end on a transport node, according to an example embodiment of the invention.

FIG. 3 is a flow diagram of a method which may be performed by a discovery agent, upon the discovery of a link end on a local Transport Node, according to an example embodiment of the invention. At 301, the local Transport Node's capability information is captured through the generation of multiple Connectivity Attribute Group (CAG) information structures. At 302, layer adjacency discovery is performed and Discovery Agent agency is established. (This can be accomplished for example by a Link Discovery function (such as 202 of FIG. 2) being notified of the link end and the Link Discovery function attempting to discover transport node adjacencies (or in other words a neighbour Transport Node connected to the local Transport Node by an equipment adjacency link) using the test and/or trace methods described in G.7714. Once a transport node adjacency has been identified, a control adjacency link (e.g. 145 of FIG. 1) is established with the Discovery Agent of the neighbour Transport Node.) (At this time or before the control adjacency link is established, the neighbor Transport Node's capability information is captured through the generation of multiple Connectivity Attribute Group (CAG) information structures.) At 303 and 304, the local Transport Node's capability information is transmitted to the neighbour Transport Node over the established control adjacency link and the neighbour Transport Node's capability information is transmitted to the local Transport Node over the established control adjacency link. (This can be performed for example by a Transport Entity Capability Exchange function (such as 203 of FIG. 2) at each transport node's Discovery Agent.). At 305 and 306, the locally generated CAGs and the CAGs received from the neighbour transport node are examined to correlate the network layers supported and identify network layers with potential links. (This can be performed for example by a Transport Capability Correlation function (such as 204 of FIG. 2) at each transport node's Discovery Agent.) At 307, the Discovery Agents at each transport node communicates any potential links to the respective Link Resource Managers.

The set of CAGs describe the possible forms of flexible connectivity, and may be generated using a general connectivity model as described below.

Use of a General Connectivity Model

In example embodiments of the invention, a General Connectivity Model is used to describe the relationships between International Telecommunication Union Recommendation G.805 (hereinafter referred to as "G.805") Functional Modelling Components (shown in the legend of FIG. 4) which may exist within a node.

G.805 Functional Modelling

Figure 4:
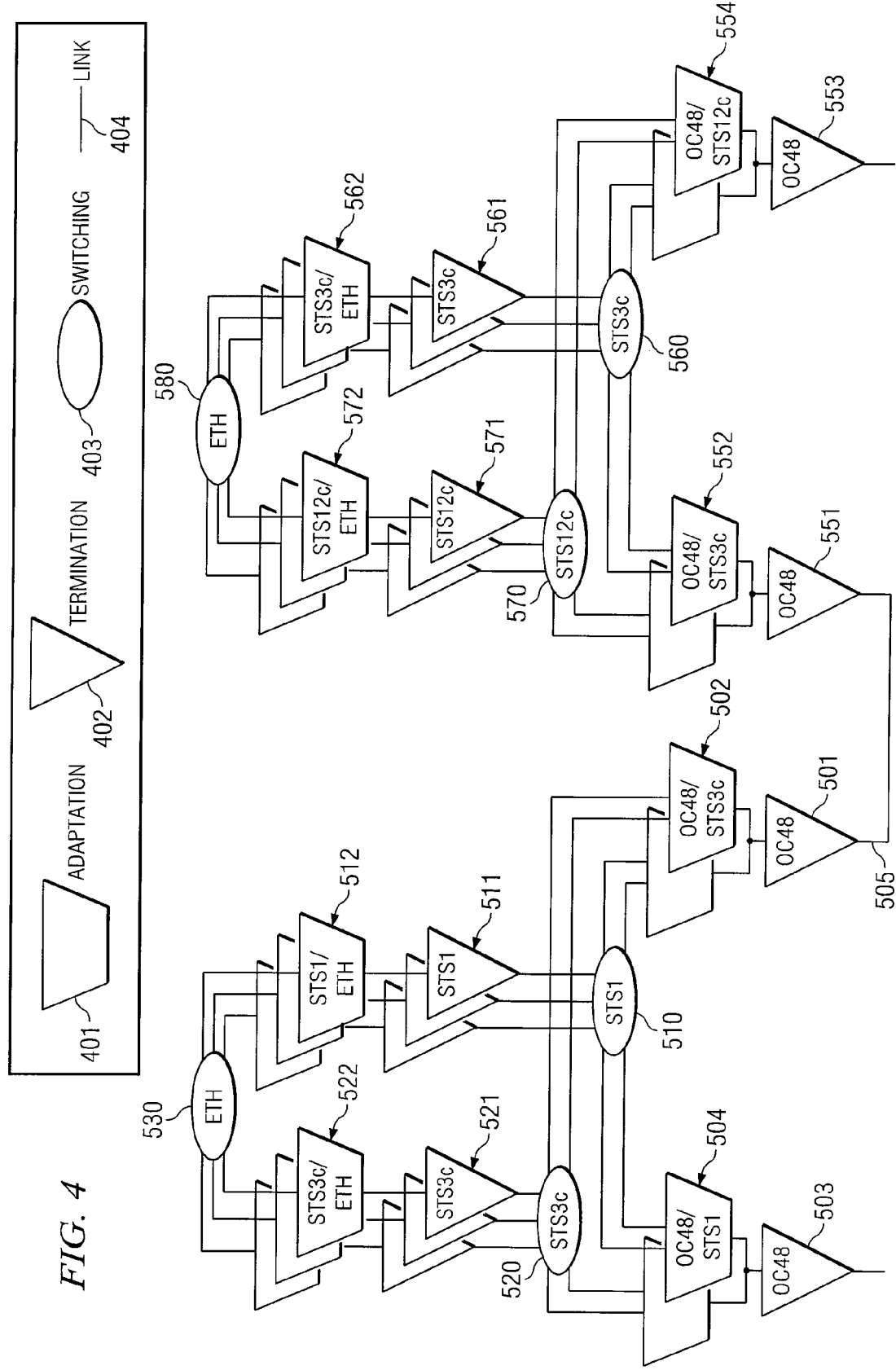
FIG. 4 illustrates a G.805 modelling that corresponds to the transport nodes shown in FIG. 1, according to an example embodiment of the invention.

In an example embodiment of the invention, the General Connectivity Model includes a G.805 modelling for each Transport Node for which capability information is sought. An example G.805 modelling that corresponds to the Transport Nodes shown in FIG. 1 is illustrated in FIG. 4.

Figure 5:
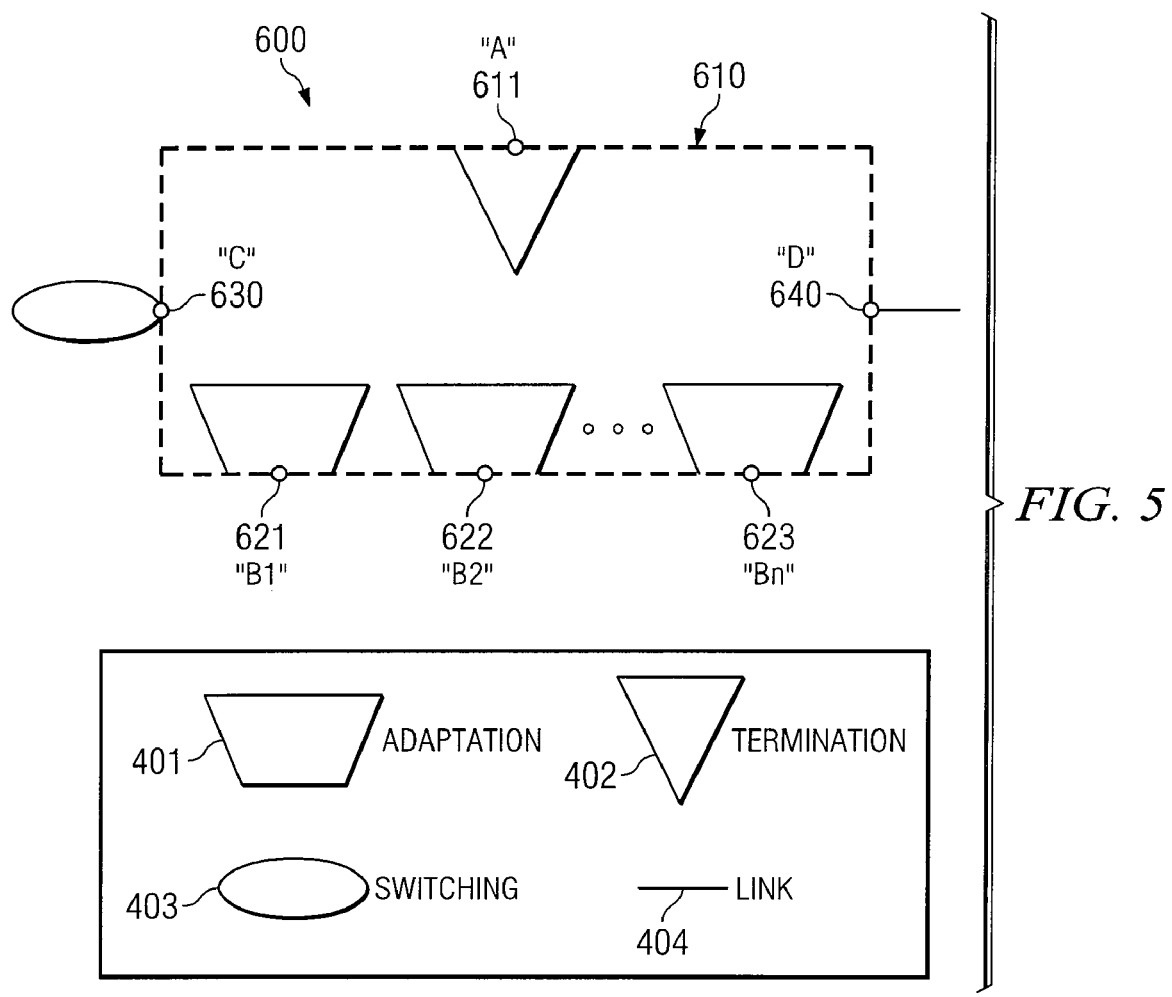
FIG. 5 illustrates a general connectivity block, according to an example embodiment of the invention.

Modelling of Flexible Connectivity within a Transport Node, by a General Connectivity Block In an example embodiment of the invention, the General Connectivity Model includes a modelling of the flexible connectivity within a Transport Node. This flexible connectivity within a Transport Node can be represented by a general connectivity block with interface points toward (A) client layers, (B) server layers, (C) a switching function in the current layer, and (D) link connections to a neighbour node, according to an example embodiment of the invention. An example embodiment general connectivity block is shown in FIG. 5. (FIG. 5 uses the G.805 Function Modelling Components defined in the legend of FIG. 4.)

An example embodiment of the invention may describe transmit direction connectivity (e.g. from a switching function toward a link) using one or more of the following connectivity types:

1) C-D: connectivity from a switching function to a link in this layer

2) C-Bi: connectivity from a switching function to a server layer (Bi represents a particular server type and adaptation type, and there can be multiple server choices and multiple adaptation choices for a given server)

3) C-A: connectivity from a switching function to a termination sink of this layer (leading to a client layer which may be identified, along with the adaptation type, by association with a Bi point on a connectivity block in the client layer)

4) A-D: connectivity from a termination source to a link in this layer (the client signal type and adaptation type may be identified, along with the adaptation type, by association with a Bi point on a connectivity block in the client layer)

5) B-D: connectivity from a server layer to a link in this layer

6) A-Bix: connectivity from an termination source for this layer to a server layer in the transmit direction ('x' indicates transmit direction)

7) B-Ax: connectivity from a server layer to a termination sink in this layer in the transmit direction 8) C-C: connectivity from a switching function to the same switching function in this layer (this can be used, for example, for a service function in this layer that creates a new or improved copy, or generation, of the signal to be routed, e.g. a regenerator or retimer)

9) Bi-Bjx: connectivity from one server layer to another server layer in the transmit direction (i may be the same as j in the case of a service function, as above, or i and j may be different representing a change from one server type to another or one adaptation type to another)

An example embodiment of the invention may describe receive direction connectivity (e.g. from a link towards a switching function) by using one or more of the following connectivity types:

10) D-C: connectivity from a link to a switching function in this layer

11) D-A: connectivity from a link to a termination sink in this layer

12) D-Bi: connectivity from a link to a server layer

13) A-C: connectivity from a termination source to a switching function in this layer 14) B-C: connectivity from a server layer to a switching function in this layer 15) A-Bir: connectivity from a termination source in this layer to a server layer in the receive direction ('r' for receive direction)

16) B-Ar: connectivity from a server layer to a termination sink in this layer in the receive direction 17) Bi-Bjr: connectivity from a server layer to a server layer in the receive direction (again may be the same as j for regeneration, or different for a change in server type and/or adaptation type)

Figure 6A:
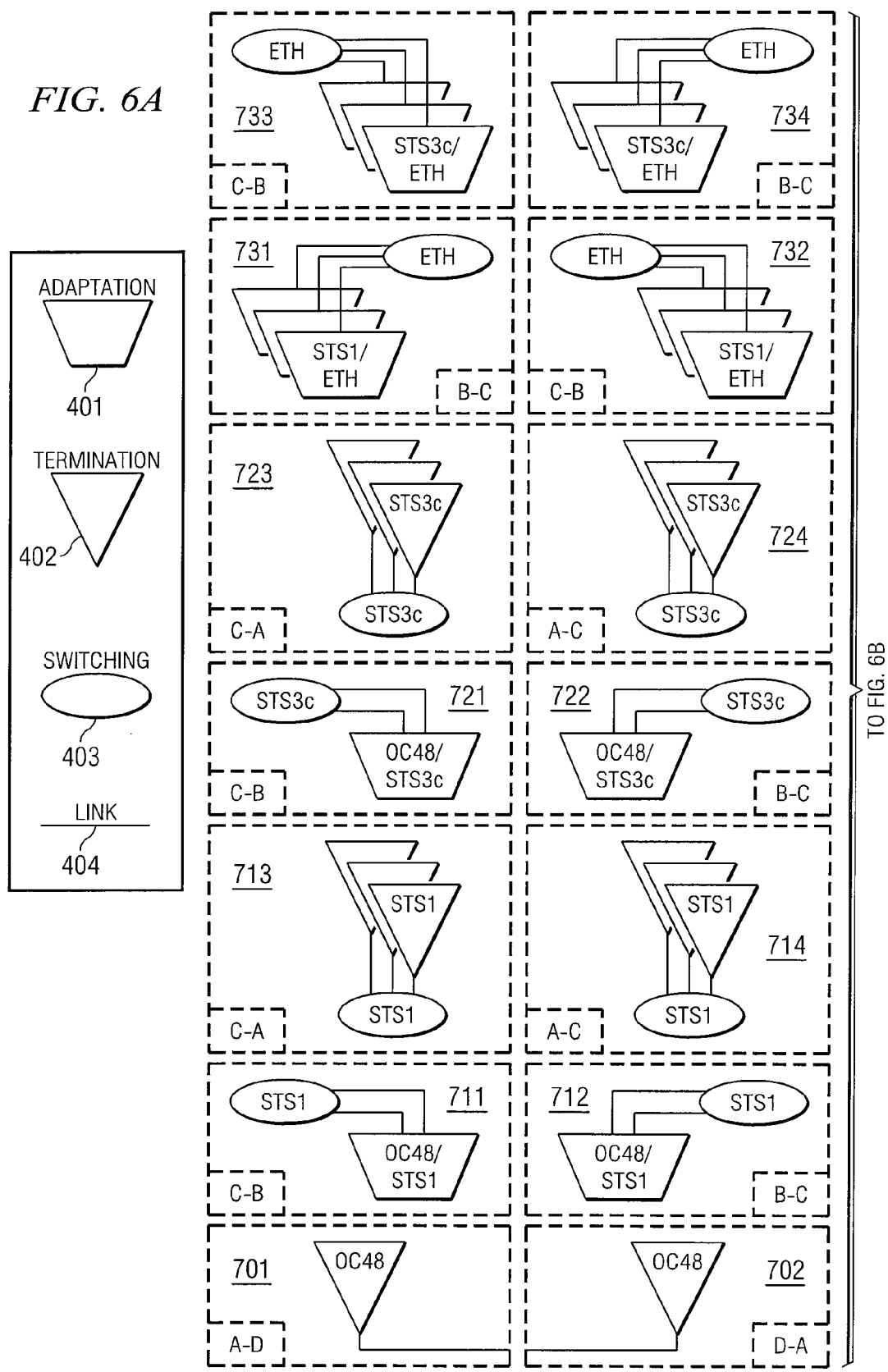
FIG. 6 illustrates general connectivity blocks which model the transport nodes shown in FIG. 4, according to an example embodiment of the invention.
Figure 6B:
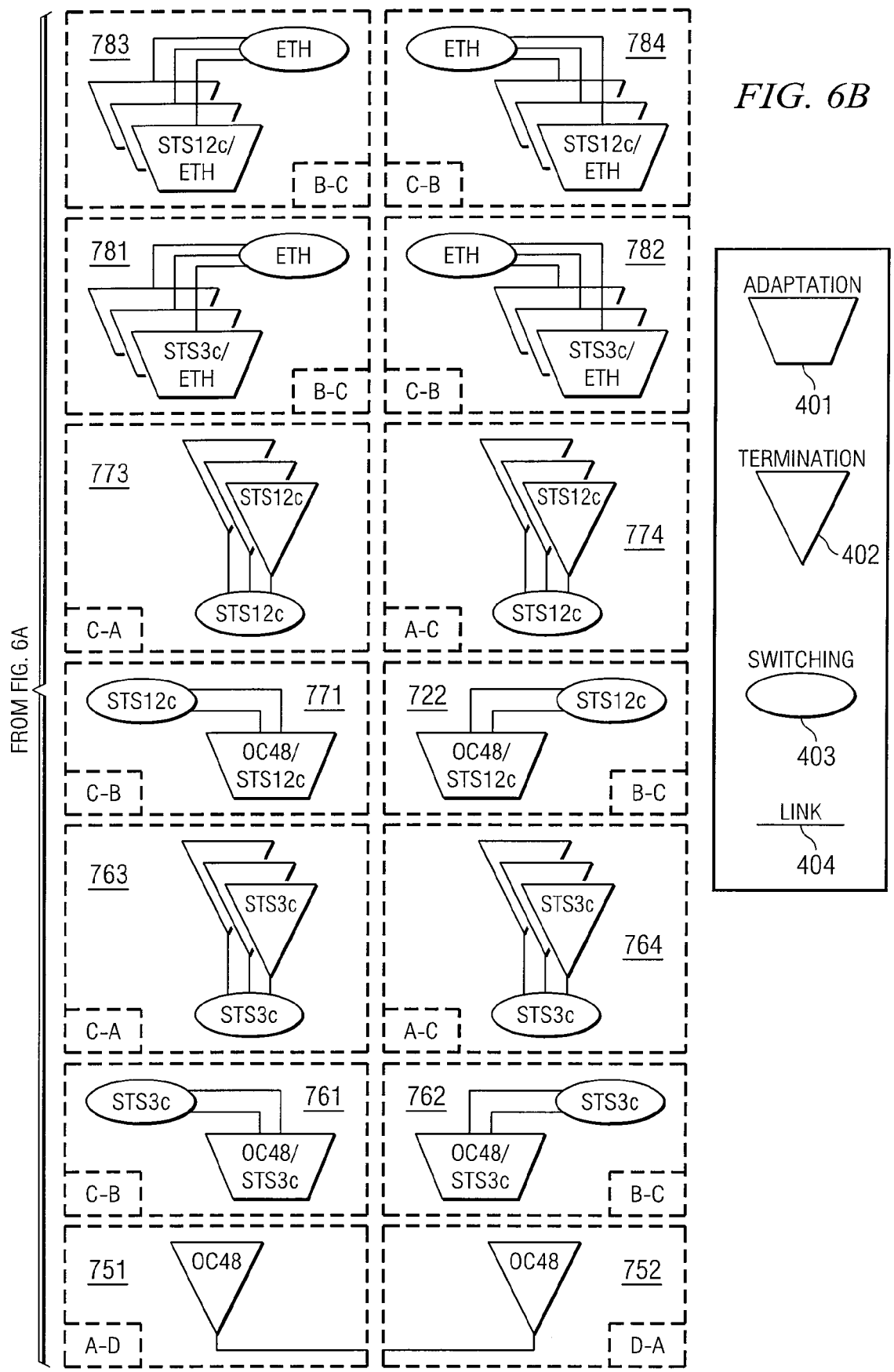

Using these connectivity types, the transport capabilities provided by a node at one end of an adjacency can be described by providing information about available connectivity along with other attributes relevant to the connectivity. Example general connectivity blocks which model the Transport Nodes shown in FIG. 4, can be found in FIG. 6. (FIG. 6 uses the G.805 Function Modelling Components defined in the legend of FIG. 4.) An example information structure for describing the transport capabilities at one end of an adjacency is described in the next section.

Modelling of Transport Capabilities at One End of an Adjacency Link, by a Connectivity Attribute Group In an example embodiment of the invention, the General Connectivity Model includes a modelling of transport capabilities at a link end (a port or other equipment interface at the end of an equipment adjacency link). Furthermore, the transport capabilities at each link end can be exchanged (using for example TCE) to enable characterization of the link(s) and other capabilities (e.g., layer transitions) made available by that adjacency. A modelling of transport capabilities can be organized around the general connectivity block concept described in the previous section. This can be done using the concept of a Connectivity Attribute Group (CAG) that contains information about the types of connectivity that a node supports at its end of an adjacency.

Figure 7:
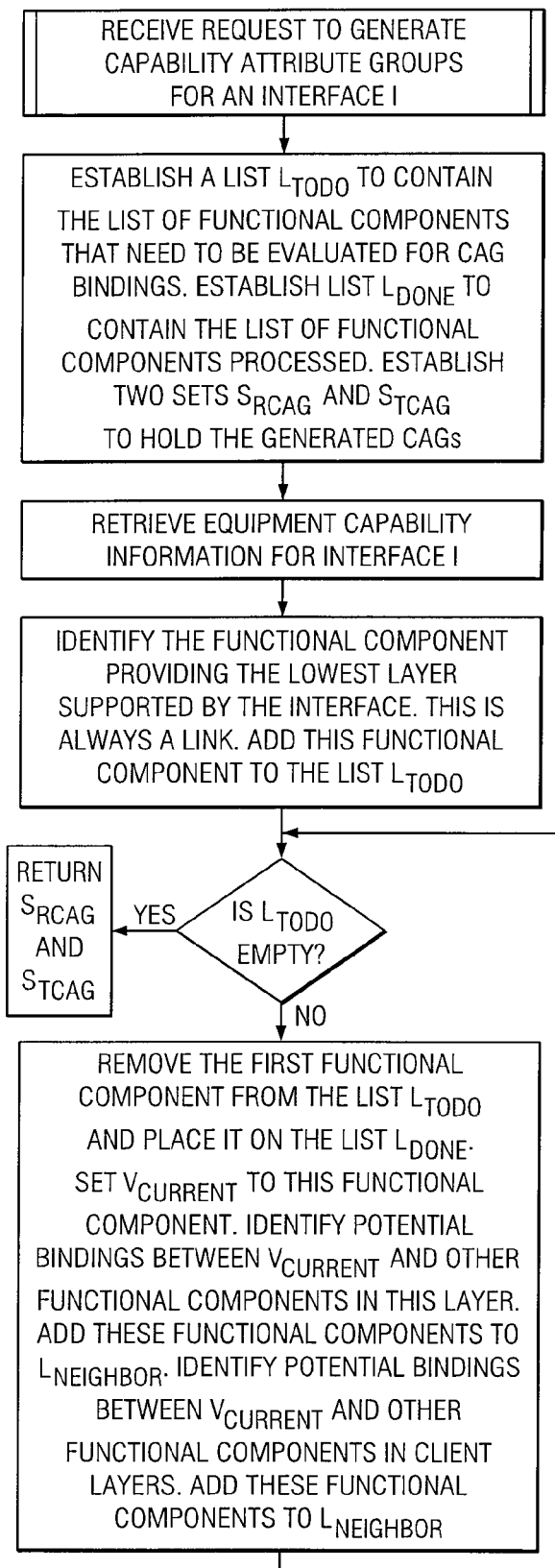
FIG. 7 is a flow diagram of method for generating Connectivity Attribute Groups for an interface associated with a discovered adjacency, according to an example embodiment of the invention.
Figure 7:
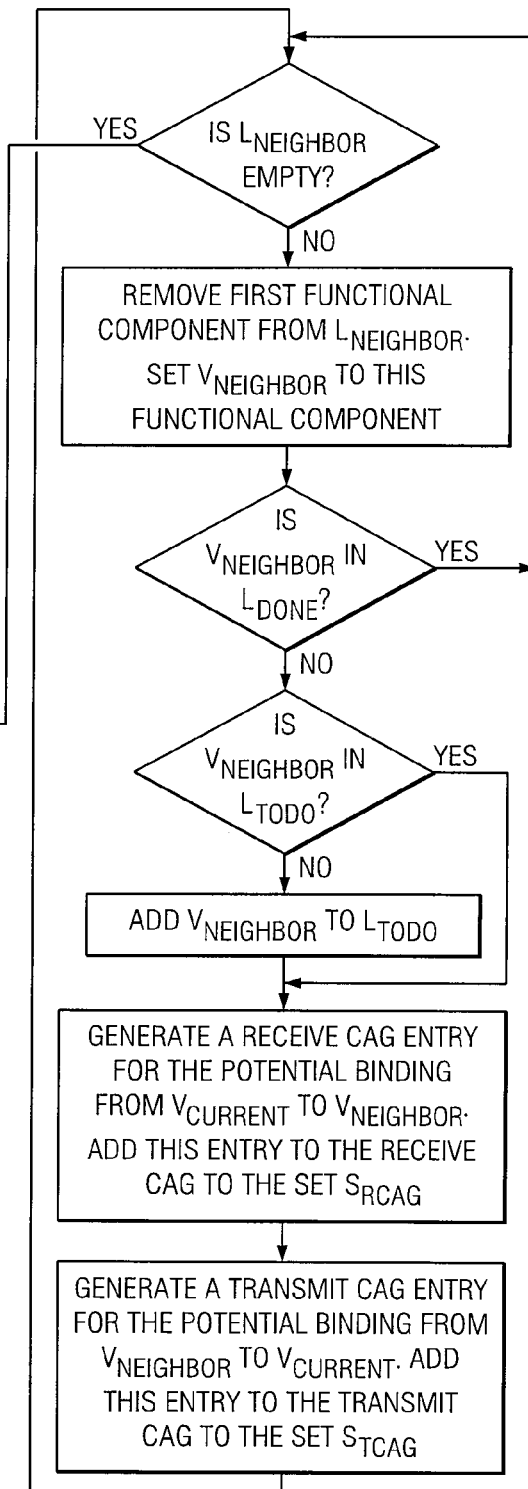

A Connectivity Attribute Group represents a general connectivity block, and can be used to describe at least a portion of the connectivity and related attributes provided by each node at the end of a discovered adjacency. FIG. 7 provides an example embodiment method for generating Connectivity Attribute Groups for an interface associated with a discovered adjacency.

TCE (or other exchange of transport node capability information) may use a set of CAGs, each of which represents the connectivity and related attributes available within a given network layer. An example embodiment CAG information structure may include one or more of the following:

1. Signal Type: identifies a layer. There may be more than one CAG with a given Signal Type in an interface if necessary to properly convey the capabilities available.
2. CAG ID: identifies a CAG in the context of TCE. This ID must be unique within the scope of a link end.
3. CAG Entries: blocks of information, each conveying a connectivity type and associated attributes.

A CAG Entry example embodiment may contain one or more of the following information:

1. Connectivity Type: one of the seventeen connectivity types listed above in the general connectivity model.
2. Regeneration Flag: indicates whether or not the connectivity includes regeneration, that is, whether a new generation of the signal is created.
3. Routing Cost: (optional) the assigned cost of using this connectivity at this layer in a route. This information can be used in developing link advertisements based on the discovered adjacency. Multiple cost values may be provided for cases in which the cost policy can be selected or affected by routing constraints. Alternatively, the cost can be provided by other means (it is not required to be included in TCE).
4. Available Capacity: (optional) the available capacity of this connectivity. Often available capacity can be calculated based on a physical or TDM adjacency. In some cases, however, policy may dictate a reduction in the capacity allocated to particular types of connectivity. Capacity may be expressed, for example, in bits per second or as a number of predetermined resource partitions (e.g., number of timeslots or channels). To handle unidirectional cases, Available Capacity=0 (to show binding of B point to server CAG in cases in which x-B connectivity is not provided in equipment).
5. Next CAG ID: identifies the next CAG to visit in case of connectivity to an A, or B point. If the connectivity provided is to an A point, any of the B points in the Next CAG that have CAG entries that refer back to this CAG can be considered.
6. Adaptation Type: indicates the type of adaptation to the server layer for this connectivity type. This field applies to connectivity types toward B points. This value may be scoped by the Signal Type of this CAG (client layer) and the Signal Type of the CAG referenced by the Next CAG ID (server layer).
7. Capacity Conversion: (optional) indicates how capacity at this layer is converted to capacity at the server layer specified by this connectivity type. This field applies to connectivity types toward B points.

If an interface is highly flexible (e.g. NPU based hardware designs) but has limits to the number of operations (e.g. layer transitions) that can be supported at any one time or for any particular flow, this constraint can be conveyed by providing the following:

1. Maximum Operation Credits: the maximum number of operation credits that can be supported in one traversal of the link end. This information would be conveyed once for this end of an adjacency.
2. Operation Cost: the number of operation credits required to use the connectivity type in a given CAG Entry. This information would be included in each CAG Entry.

Given this additional information it is possible to determine which combinations of connectivity can be supported at one end of an adjacency for a given connection or flow. An example set of the CAGs generated from the Connectivity Blocks shown in FIG. 6 can be found in FIG. 8.

Exchange of a Transport Node's Capability Information

Using the information described in the previous section, the two ends of an adjacency can exchange transport capabilities and evaluate the potential links and layer transitions supported by that adjacency. This evaluation can be accomplished without specific knowledge of the technologies involved. Signal type and adaptation type information, along with the CAG IDs, allow a generic algorithm to determine where matching capabilities exist and what transport capabilities can be provided from one end of the adjacency to the other. This generic analysis is possible due to the symbolic nature of functional modelling (that is, exchanging information structured around the general connectivity model which is itself based on G.805 concepts). This analysis can be used to generate alternative proposals during Transport Capability Exchange and to provide a Link Resource Manager with information from which to characterize links and generate link sate advertisements (if, for example, a link state routing protocol is to be used). Example embodiments for the invention may be taken into consideration in ASON transport capability.

In the foregoing description, the invention is described with reference to specific example embodiments thereof. The specification and drawings are accordingly to be regarded in an illustrative rather than in a restrictive sense. It will, however, be evident that various modifications and changes may be made thereto, in a computer program or software, hardware or any combination thereof, without departing from the broader spirit and scope of the invention.

FIGS. 3 and 7 are flow diagrams illustrating methods according to example embodiments of the invention. The techniques illustrated in these figures may be performed sequentially, in parallel or in an order other than that which is described. It should be appreciated that not all of the techniques described in the flow diagrams are required to be performed, that additional techniques may be added, and that some of the illustrated techniques may be substituted with other techniques.

Software embodiments of the invention may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

We claim:

1. A method for managing transport node capability information, comprising:
    discovering a link end of a local transport node;
    modelling the local transport node's capability information using general connectivity blocks as part of a first set of information structures;
    discovering a neighbour transport node;
    establishing a control adjacency link between control elements of the local transport node and neighbour transport node;
    modelling the neighbour transport node's capability information using general connectivity blocks as part of a second set of information structures;
    exchanging the first and second sets of information structures between the control elements; and
    identifying potential network layer transitions and links between the local and neighbour transport nodes, based on correlations in the first and second sets of information structures.

2. The method of claim 1, further comprising:
    generating link state advertisements identifying the first and second sets of information structures.

3. The method of claim 1, further comprising:
    determining routes in the local and neighbour transport nodes in response to the potential network layer transitions and links.

4. A method for managing transport node capability information, comprising:
    discovering a link end of a local transport node;
    modelling the local transport node's capability information as a first set of information structures, the first set of information structures identifying a network layer supported by the transport node, a connectivity type within the supported network layer, an available capacity of the connectivity type, an adaptation type for adapting to another layer for the connectivity type, and a capacity conversion indicating how a capacity of the network layer is converted to a capacity at another layer;
    discovering a neighbour transport node;
    establishing a control adjacency link between control elements of the local transport node and neighbour transport node;
    modelling the neighbour transport node's capability information as a second set of information structures;
    exchanging the first and second sets of information structures between the control elements; and
    identifying potential network layer transitions and links between the local and neighbour transport nodes, based on correlations in the first and second sets of information structures.

5. The method of claim 4, wherein the connectivity type indicates a connectivity among a link, termination, switching function, and adaptation function within the transport node.

6. A system for managing transport node capability, comprising:
    a transport node operable to provide switching and adaptation functions associated with different switching layers;
    a control element operable to determine the functions provided by the transport node, the control element operable to generate a first set of information structures including general connectivity blocks associated with the transport node's communication capabilities, the control element operable to establish a control adjacency link with an adjacent control element associated with an adjacent transport node connected to the transport node, the control element operable to determine the functions provided by the adjacent transport node through the control adjacency link, the control element operable to receive a second set of information structures including general connectivity blocks associated with the adjacent transport node over the control adjacency link, the control element operable to identify potential network layer transitions and links between the transport node and the adjacent transport node in response to the first and second set of information structures.

7. The system of claim 6, wherein the control element includes a discovery agent operable to determine the functions provided by the transport node.

8. The system of claim 7, wherein the discovery agent includes a transport entity capability exchanger operable to provide the first set of information structures to an adjacent discovery agent of an adjacent control element over the control adjacency link, the transport entity capability exchanger operable to receive the second set of information structures from the adjacent discovery agent of the adjacent control element over the control adjacency link.

9. The system of claim 7, wherein the discovery agent includes a transport capability correlator operable to correlate network layers supported by the transport node and the adjacent transport node and identify network layer transitions with potential links therebetween.

10. The system of claim 7, wherein the discovery agent includes a local transport node capability discovery unit operable to identify a link end and common and shared service functions of the transport node.

11. The system of claim 7, wherein the discovery agent includes a link discovery unit operable to identify network layer adjacencies and the adjacent transport node.

12. The system of claim 11, wherein the link discovery unit is operable to establish the control adjacency link.

13. The system of claim 6, wherein the transport node provides switching and termination at one or more network layers and adaptation between network layers.

14. The system of claim 13, wherein the one or more network layers include any of STS1, STS3, OC48, and Ethernet protocols.

15. The system of claim 6, wherein the control element includes a link resource manager operable to determine routes in the transport node and the adjacent transport node in response to the potential network layer transitions and links.

16. A system for managing transport node capability information, comprising:
   means for discovering a link end of a local transport node;
   means for modelling the local transport node's capability information using general connectivity blocks as part of a first set of information structures;
   means for discovering a neighbour transport node;
   means for establishing a control adjacency link between control elements of the local transport node and neighbour transport node;
   means for modelling the neighbour transport node's capability information using general connectivity blocks as part of a second set of information structures;
   means for exchanging the first and second sets of information structures between the control elements; and
   means for identifying potential network layer transitions and links between the local and neighbour transport nodes, based on correlations in the first and second sets of information structures.

17. The system of claim 16, further comprising:
   means for generating link state advertisements identifying the first and second sets of information structures.

18. The system of claim 16, further comprising:
   means for determining routes in the local and neighbour transport nodes in response to the potential network layer transitions and links.

19. A system for managing transport node capability information, comprising:
   means for discovering a link end of a local transport node;
   means for modelling the local transport node's capability information as a first set of information structures, the first set of information structures identifying a network layer supported by the transport node, a connectivity type within the supported network layer, an available capacity of the connectivity type, an adaptation type for adapting to another layer for the connectivity type, and a capacity conversion indicating how a capacity of the network layer is converted to a capacity at another layer;
   means for discovering a neighbour transport node;
   means for establishing a control adjacency link between control elements of the local transport node and neighbour transport node;
   means for modelling the neighbour transport node's capability information as a second set of information structures;
   means for exchanging the first and second sets of information structures between the control elements; and
   means for identifying potential network layer transitions and links between the local and neighbour transport nodes, based on correlations in the first and second sets of information structures.

20. The system of claim 19, wherein the connectivity type indicates a connectivity among a link, termination, switching function, and adaptation function within the transport node.

\* \* \* \* \*